United States Patent
Sonar et al.

(10) Patent No.: US 10,975,623 B2
(45) Date of Patent: Apr. 13, 2021

(54) HIGH TORQUE CONSTANT VELOCITY JOINT FOR DOWNHOLE DRILLING POWER TRANSMISSION

(71) Applicant: Halliburton Energy Services, Inc., Houston, TX (US)

(72) Inventors: Sandip Sonar, Edmonton (CA); Hamid Sadabadi, Edmonton (CA); Steven Park, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 392 days.

(21) Appl. No.: 16/062,046

(22) PCT Filed: Feb. 2, 2016

(86) PCT No.: PCT/US2016/016148
§ 371 (c)(1),
(2) Date: Jun. 13, 2018

(87) PCT Pub. No.: WO2017/135929
PCT Pub. Date: Aug. 10, 2017

(65) Prior Publication Data
US 2018/0371839 A1    Dec. 27, 2018

(51) Int. Cl.
*E21B 4/00*        (2006.01)
*F16D 3/205*       (2006.01)
(Continued)

(52) U.S. Cl.
CPC .............. *E21B 4/006* (2013.01); *E21B 4/02* (2013.01); *E21B 10/40* (2013.01); *F16D 3/2057* (2013.01);
(Continued)

(58) Field of Classification Search
CPC . E21B 4/006; E21B 4/02; E21B 10/40; E21B 4/003; E21B 7/208; F16D 3/221; F16D 3/2057
(Continued)

(56) References Cited

U.S. PATENT DOCUMENTS 1,143,571 A * 6/1915 Cooper ................... F16D 3/221
                                                   464/152
4,008,582 A    2/1977 Welschof
(Continued)

FOREIGN PATENT DOCUMENTS

| | | |
|---|---|---|
| CA | 2541339 C | 9/2007 |
| CN | 203809529 U | 9/2014 |
| WO | WO-2014151518 A1 | 9/2014 |

OTHER PUBLICATIONS

Basic Requirements for Constant Velocity (CV) Universal Joints, Universal Joint and Driveshaft Design Manual, AE-7, Society of Automotive Engineers, Warrendale, PA, pp. 99-101, TJ1079.S62 (Year: 1979).*

(Continued)

*Primary Examiner* — Greg Binda

(57) ABSTRACT

A constant velocity joint for downhole power transmission has a first insert mounted in a radially extending drive shaft arm. The first insert engages a second insert mounted along a slot formed in a tubular housing disposed to receive the arm. The material for the two inserts may be different, having different galling properties. An insert may be shaped to have at least a flat surface, a cylindrical surface intersecting the flat surface, and a conical surface intersecting the cylindrical surface. The inserts may extend beyond the cavities in which they are mounted. Opposing cavity walls adjacent the cavity opening may be angled away from one another to permit the insert to flex under a load. The back (Continued)

wall of a cavity and back surface of an insert may be arcuate to permit rotational movement of the insert under a load.

20 Claims, 12 Drawing Sheets

(51) Int. Cl.
  *E21B 4/02* (2006.01)
  *E21B 10/40* (2006.01)
  *F16D 3/221* (2006.01)
  *E21B 7/20* (2006.01)

(52) U.S. Cl.
  CPC .............. *F16D 3/221* (2013.01); *E21B 4/003* (2013.01); *E21B 7/208* (2013.01)

(58) Field of Classification Search
  USPC ........................................................ 464/152
  See application file for complete search history.

(56) References Cited

U.S. PATENT DOCUMENTS

| | | | | |
|---|---|---|---|---|
| 4,518,368 | A * | 5/1985 | Peretti | F16D 3/64 |
| | | | | 464/123 |
| 5,224,898 | A * | 7/1993 | Johnson | E21B 17/07 |
| 6,112,835 | A | 9/2000 | Grafe et al. | |
| 6,554,114 | B2 | 4/2003 | Lee | |
| 7,186,182 | B2 | 3/2007 | Wenzel et al. | |
| 8,033,917 | B2 | 10/2011 | Prill et al. | |
| 8,062,140 | B2 | 11/2011 | Wall et al. | |
| 10,408,274 | B2 * | 9/2019 | Marchand | E21B 17/04 |

OTHER PUBLICATIONS

Korean Intellectual Property Office, PCT/US2016/016148, International Search Report and Written Opinion, dated Oct. 27, 2016, 16 pages, Korea.

* cited by examiner

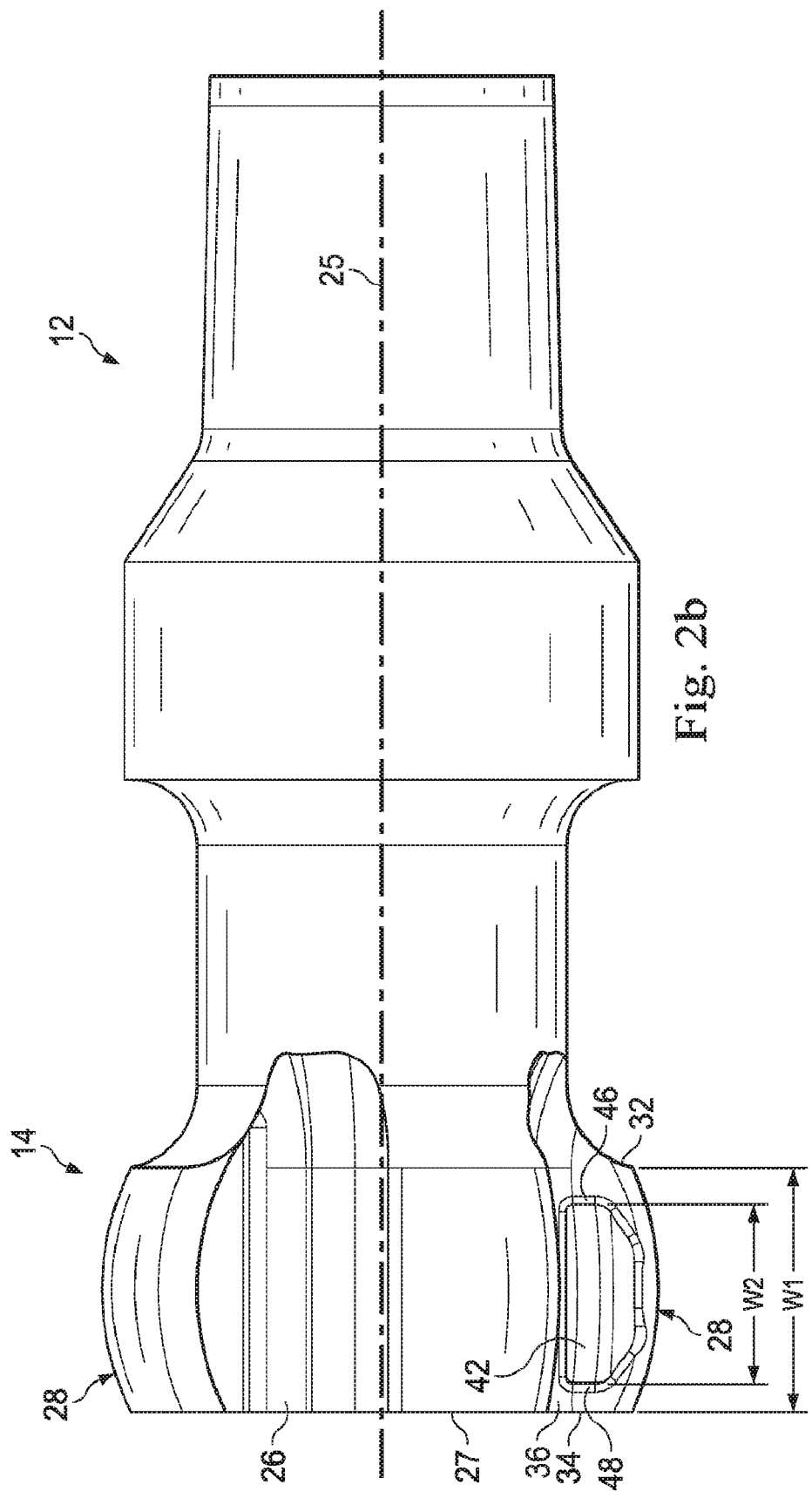

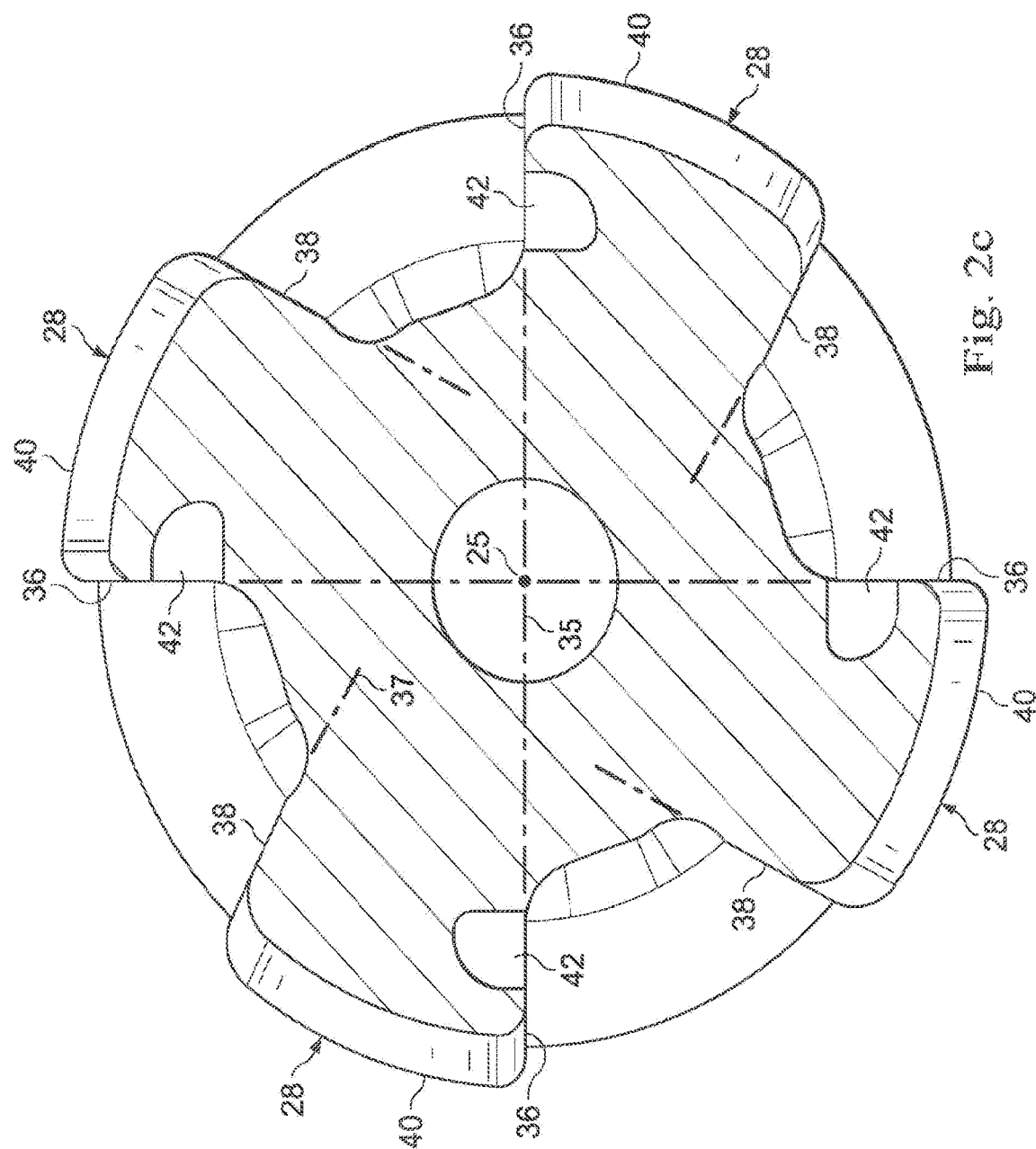

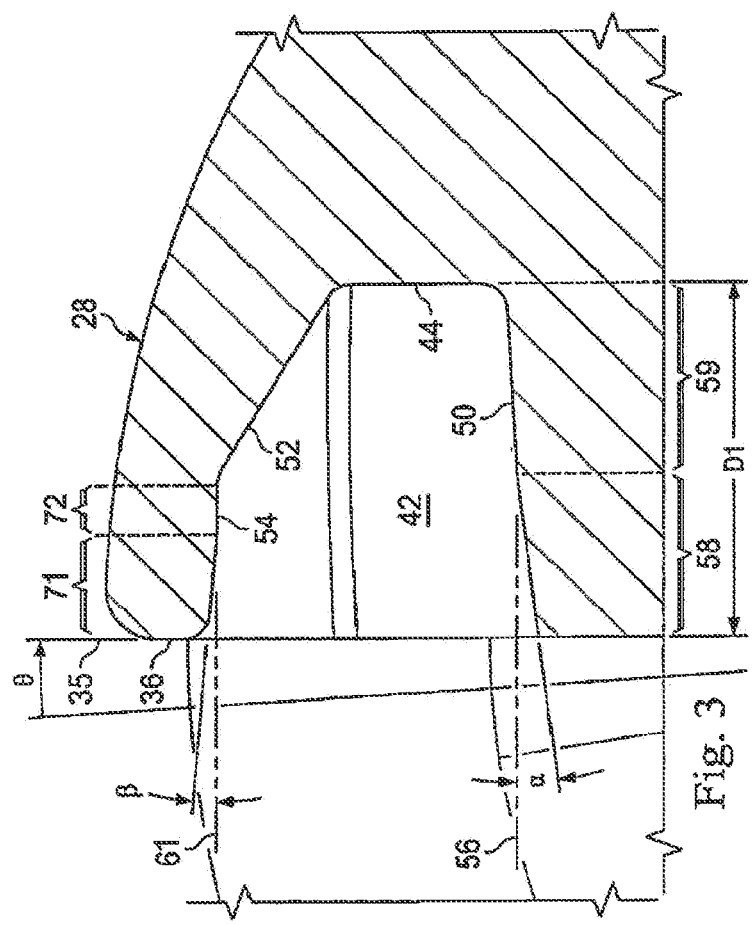

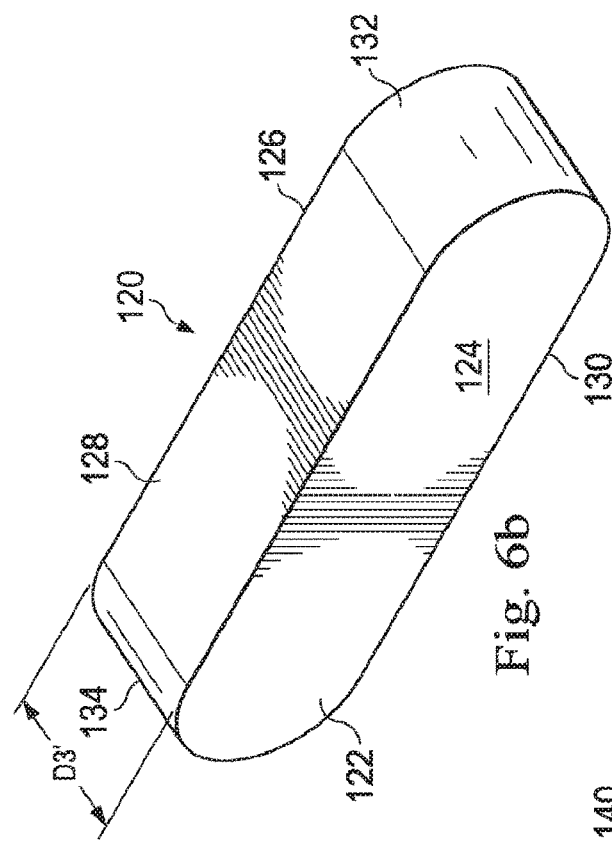
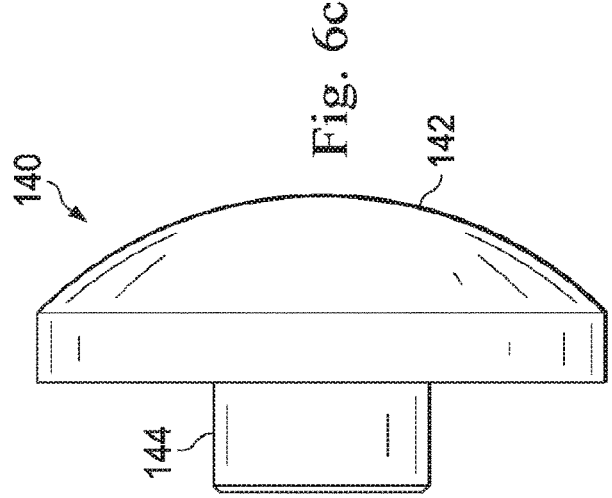
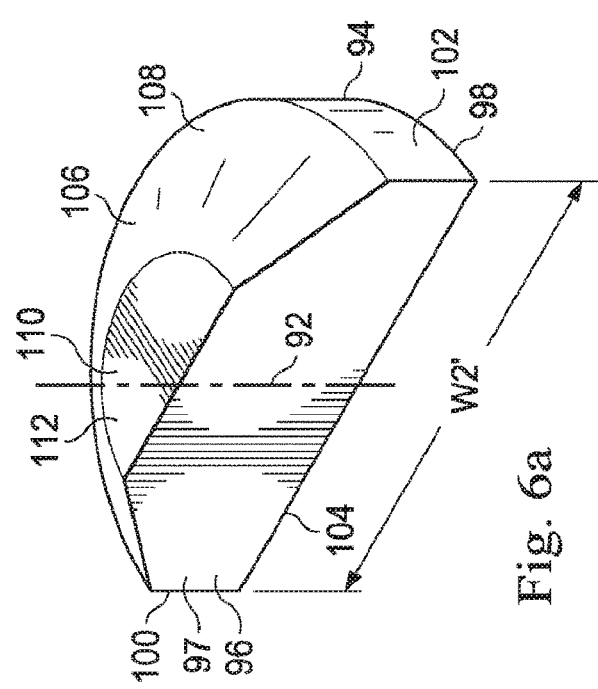
Fig. 6a
Fig. 6b
Fig. 6c

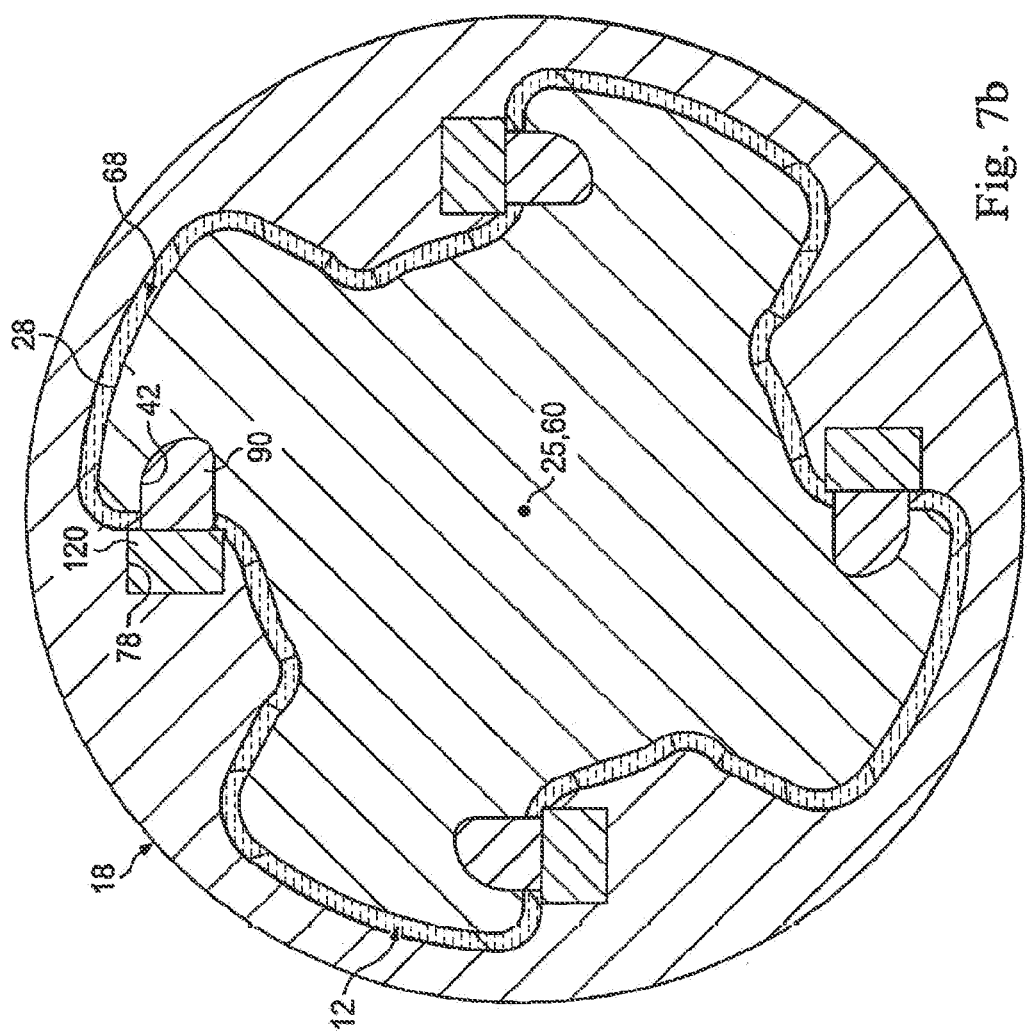

HIGH TORQUE CONSTANT VELOCITY JOINT FOR DOWNHOLE DRILLING POWER TRANSMISSION

CROSS-REFERENCE TO RELATED APPLICATION

This application is a U.S. national stage patent application of International Patent Application No. PCT/US2016/016148, filed on Feb. 2, 2016 the benefit of which is claimed and the disclosure of which is incorporated herein by reference in its entirety.

BACKGROUND

The disclosure relates in general to transmission of torque between rotating components in downhole tools. More particularly, the disclosure relates to high torque constant velocity joints for drive shafts associated with downhole motors used in the oil and gas industry.

In oil and gas drilling, it is important to provide rotational energy to a drill bit connected to a drill string in order to advance the drill bit to create a desired wellbore. Traditionally, the drill bit has been rotated by rotation of the drill string utilizing the "rotary table" or "top drive" of a drilling rig located at the surface of a formation. However, with the prevalence of horizontal or other non-vertical wellbores, i.e., deviated wellbores, transmission of rotation power from the surface to the drill bit via a rotating drill string has become more difficult, and as such, has given rise to downhole power systems. Downhole power systems typically utilize drilling mud pumped from the surface to drive a motor, called a downhole motor or mud motor, carried at the end of a drill string as part of the bottom hole assembly adjacent the drill bit. Commonly, a mud motor will consist of a power section connected to a drive shaft which is in turn connected to the drill bit. Drilling mud is pumped through a rotor and stator of the power section in order to rotate the rotor, which in turn, rotates the drive shaft. Various types of mud driven rotor-stator arrangements exist, including positive displacement systems referred to as PD Motors and turbine-type arrangements. Regardless of the type of downhole motor, a universal joint assembly may be utilized at the joint between the power section and drive shaft and also at the joint between the drive shaft and drill bit in order to transfer torque and thrust from one component to another component.

Traditional prior art universal joints utilize ball bearings as drive elements for the transfer of forces between the rotor and drive shaft. More specifically, balls carried by the drive shaft engage recesses or slots formed in the female socket section comprising the rotor so as to provide a point contact between surfaces. Another type of universal joint utilizes meshing gear elements to transfer forces via line contact between the gear elements. More recently, one or more axially extending shoulders have been formed in the convexly spherical shaped bearing surface of a drive shaft, each shoulder having a surface disposed to engage a corresponding shoulder surface formed in the concavely spherical bearing surface of a female socket section of a rotor so as to transfer torque via the engaged shoulder surfaces. To facilitate this surface contact, an insert or "key" may be provided at a shoulder surface of a spherically shaped drive shaft end to minimize wear and galling of the shoulder surfaces. However, it has been found that these surface contact universal joints of the prior art, and in particular, the inserts, continue to exhibit damage from galling, shear and compressive forces.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 2b is a partial cross-section view through the drive shaft of FIG. 2a.

FIG. 2c is a cross-section end view through the drive shaft of FIG. 2a.

FIG. 3 is a cross-sectional view of a drive shaft insert cavity formed in an arm of a drive shaft.

FIG. 4b is a cross-section view through the first end housing of FIG. 4a.

FIG. 4c is a cross-section end view through the first end housing of FIG. 4a.

FIG. 6a is a perspective view of a drive shaft insert.

FIG. 6b is a perspective view of a coupling insert.

FIG. 6c is a thrust pad.

FIG. 7b is a cross-section end view through the through the power transmission assembly of FIG. 7a.

DETAILED DESCRIPTION OF THE PREFERRED EMBODIMENT

Figure 1:
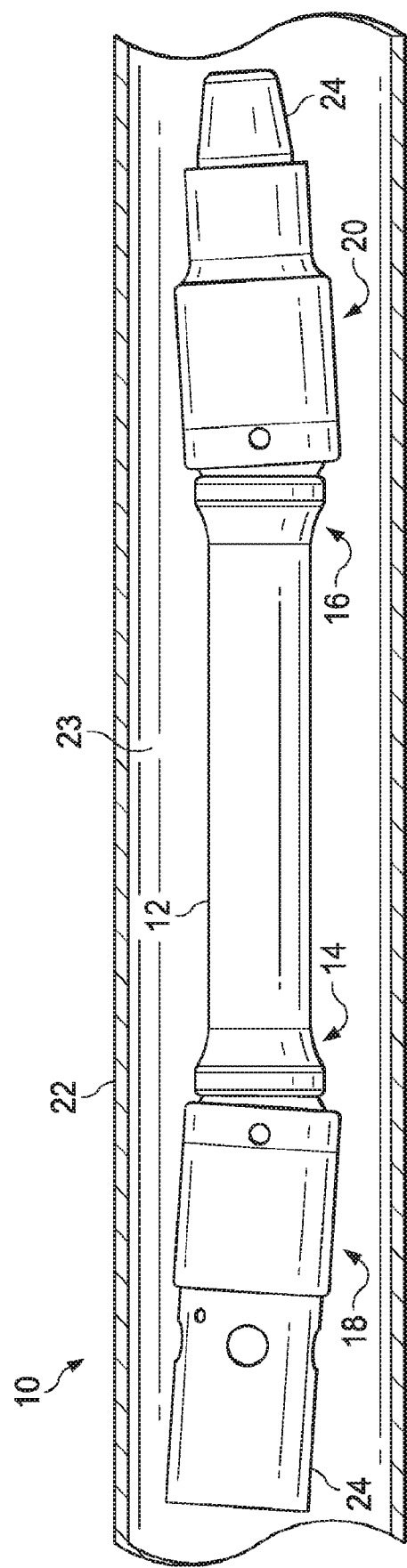
FIG. 1 is a side view of a downhole power transmission assembly.

The disclosure may repeat reference numerals and/or letters in the various examples or figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover, even though a figure may depict a horizontal wellbore or a vertical wellbore, unless indicated otherwise, it should be understood by those skilled in the art that the apparatus according to the present disclosure is equally well-suited for use in wellbores having other orientations including, deviated wellbores, multilateral wellbores, or the like. Likewise, unless otherwise noted, even though a figure may depict an offshore operation, it should be understood by those skilled in the art that the apparatus according to the present disclosure is equally well-suited for use in onshore operations and vice-versa.

With reference to FIG. 1, a drive shaft assembly 10 generally includes a drive shaft 12 having a first end 14 and a second end 16. A first end housing 18 engages the drive shaft 12 at the first end 14, while a second end housing 20 engages the drive shaft 12 at the second end 16. The drive shaft 12 and housings 18, 20 are typically contained in an elongated tubular 22 with an annular space 23 defined between the drive shaft 12 and the tubular 22. Each housing 18, 20 may include a connector 24 as is well known in the art. In one or more embodiments, connector 24 may be a pin, while in other embodiments, connector 24 may be a socket; however, any type of connector may be utilized without limiting the disclosure. Likewise, connectors 24 on separate ends may be of different types. Drive shaft assembly 10 may be connected to the output shaft (not shown) of the power section of a downhole motor via one of the connectors 24 to accommodate omni-directional rotation of drive shaft 12 relative to the motor output shaft, while transferring rotational torque and axial thrust loads from the output shaft to drive shaft 12. Likewise, drive shaft assembly 10 may be connected through a bearing assembly (not shown) to a drill bit (not shown) to accommodate omni-directional rotation of drive shaft 12 relative to the bearing assembly, while transferring rotational torque and axial thrust loads from the drive shaft 12 to the bearing assembly.

Although not necessary, in one or more embodiments, drive shaft ends 14, 16 may be substantially identical. Likewise, while not necessary, in one or more embodiments, end housings 18, 20 may be substantially identical engage the substantially identical drive shaft ends 14, 16. Thus, for purposes of the disclosure, only one of the drive shaft ends and corresponding housing will be discussed and illustrated, however, it being understood that the discussion may equally apply to the opposite end and corresponding housing.

Figure 2A:
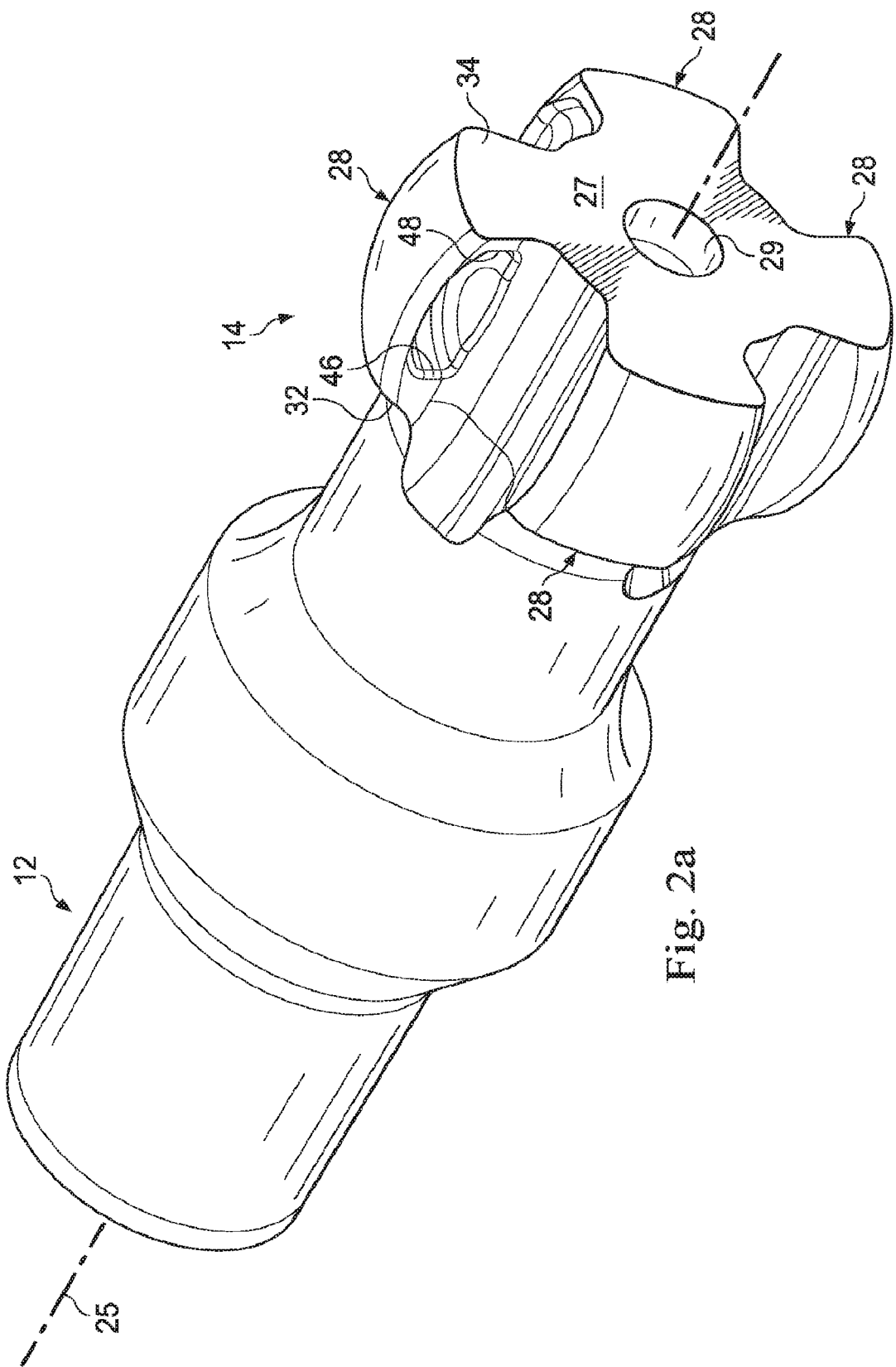
FIG. 2a is a perspective view of the first end of the drive shaft of the power transmission assembly FIG. 1

Turning to FIGS. 2a, 2b and 2c, the first end 14 of the drive shaft 12 is shown. The drive shaft assembly 12 is formed along a longitudinal axis 25, and each end of the drive shaft 12 has an end section 26 with one or more arms 28 extending radially outward from the axis 25.

In one or more embodiments, each end section 26 includes a thrust bearing surface 27. Thrust bearing surface 27 may include an aperture 29 formed therein for receipt of a thrust bearing pad (not shown). In one or more embodiments, four arms 28 are provided and equally spaced about the circumference of the main body 30 of the drive shaft 12. Arm 28 is generally elongated, extending between a first end 32 and a second end 34 so as to be parallel with axis 25. Second end 34 may form part of thrust bearing surface 27. Arm 28 has a width W1 between the first and second ends 32, 34. Each arm has a first face 36, a second face 38 and an outer bearing surface 40. Face 36 may be defined along a plane 35. In one or more embodiments, plane 35 is parallel with axis 25, while in other embodiments, plane 35 that is parallel with axis 25 and also intersects axis 25. Likewise, face 38 may be defined along a plane 37. In one or more embodiments, plane 37 is parallel with centerline 25, while in other embodiments, plane 37 that is parallel with axis 25 and also intersects centerline 25. In one or more embodiments, outer bearing surface 40 extends between the two faces 36, 38 and is convex in shape. In one or more embodiments, outer bearing surface 40 extends between the two ends 32, 34 and is convex in shape. In one or more embodiments, outer bearing surface 40 is convex in shape between the two faces 36, 38 and also between the two ends 32, 34. Formed in the first face 36 of arm 28 is a cavity 42.

Cavity 42 is generally characterized by an arcuate or cylindrically shaped back wall 44 which intersects first face 36 at a first end 46 and intersects first face 36 at an opposing second end 48, the distance between the ends 36, 38 being of width W2. Arcuate back wall 44 functions as a cylindrical bearing surface for drive shaft assembly 12, via inserts, as described below. With reference to FIG. 3, arcuate back wall 44 may be characterized as having a depth D1 where D1 may be the radius of arcuate back wall 44. Cavity 42 also has a bottom wall 50 and a first upper wall 52. First upper wall 52 extends at an angle from back wall 44. In one or more embodiments, the angle between first upper wall 52 and back wall 44 is between 115 and 130 degrees. In one or more embodiments, the angle between first upper wall 52 and back wall 44 is approximately 122 degrees. A second upper wall 54 that is substantially parallel with bottom wall 50 may extent from first upper wall 52. As such, it will be appreciated that first upper wall 52 is conical in shape and functions as a conical bearing surface for drive shaft assembly 12, via inserts, as described below. Thus, as will be appreciated, drive shaft assembly 12, via arm 28, has both a conical bearing surface and a cylindrical bearing surface for the transfer of power therethrough.

It will be appreciated that cavity 42, in one or more embodiments, may be formed in arm 28 so as to be spaced apart from outer bearing surface 40 as well as from first end 32 and second end 34 of arm 28 so as to protect an insert, such as insert 90 described below, when deployed within cavity 42. Thus, the width W2 of cavity 42 is less than the width W1 of arm 28.

Bottom wall 50 may be characterized as extending along a primary plane 56. In one or more embodiments at least a portion 58 of bottom wall 50 adjacent first face 36 forms an acute angle α of up to 8 degrees with primary plane 56. In one embodiment angle α is approximately 4 degrees. In one embodiment angle α is between 0.5 and 8 degrees. Thus, a first portion 58 of bottom wall 50 adjacent face 36 may be angled relative to a second portion 59 of bottom wall 50, the second portion 59 extending from the back wall 44.

Likewise, second upper wall 54 may be characterized as extending along a primary, plane 61. In one or more embodiments at least a portion 64 of second upper wall 54 adjacent first face 36 forms an acute angle β of up to 8 degrees with primary plane 61. In one embodiment angle .beta. is approximately 4 degrees. In one embodiment angle β is between 0.5 and 8 degrees. Thus, a first portion 64 of second upper wall 54 adjacent face 36 may be angled relative to a second portion 72 of second upper wall 54, the second portion 72 extending from first upper wall 52. In one or more embodiments, planes 56 and 61 are parallel.

Figure 4A:
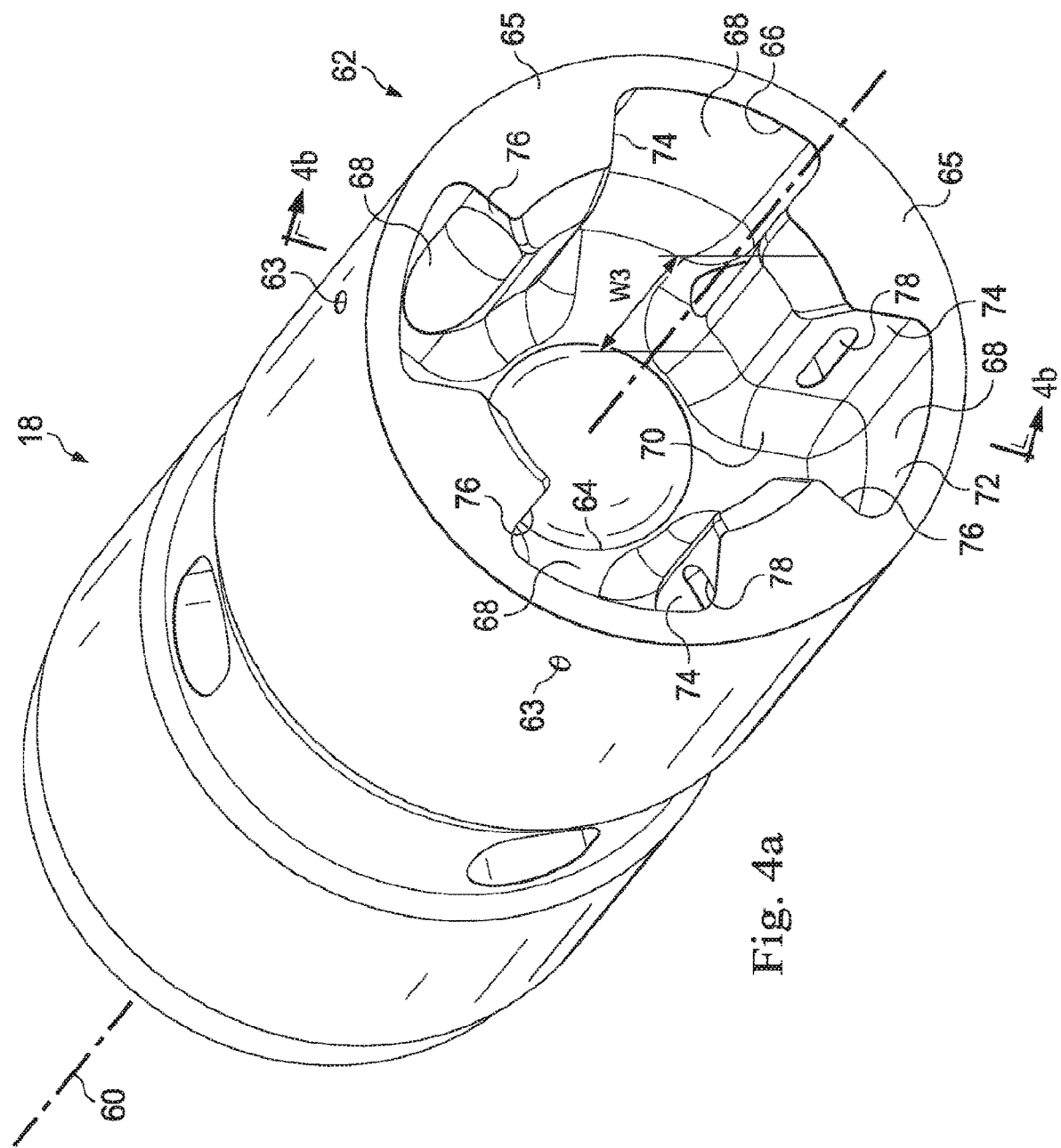
FIG. 4a is a perspective view of a first end housing of the power transmission assembly FIG. 1.
Figure 4B:
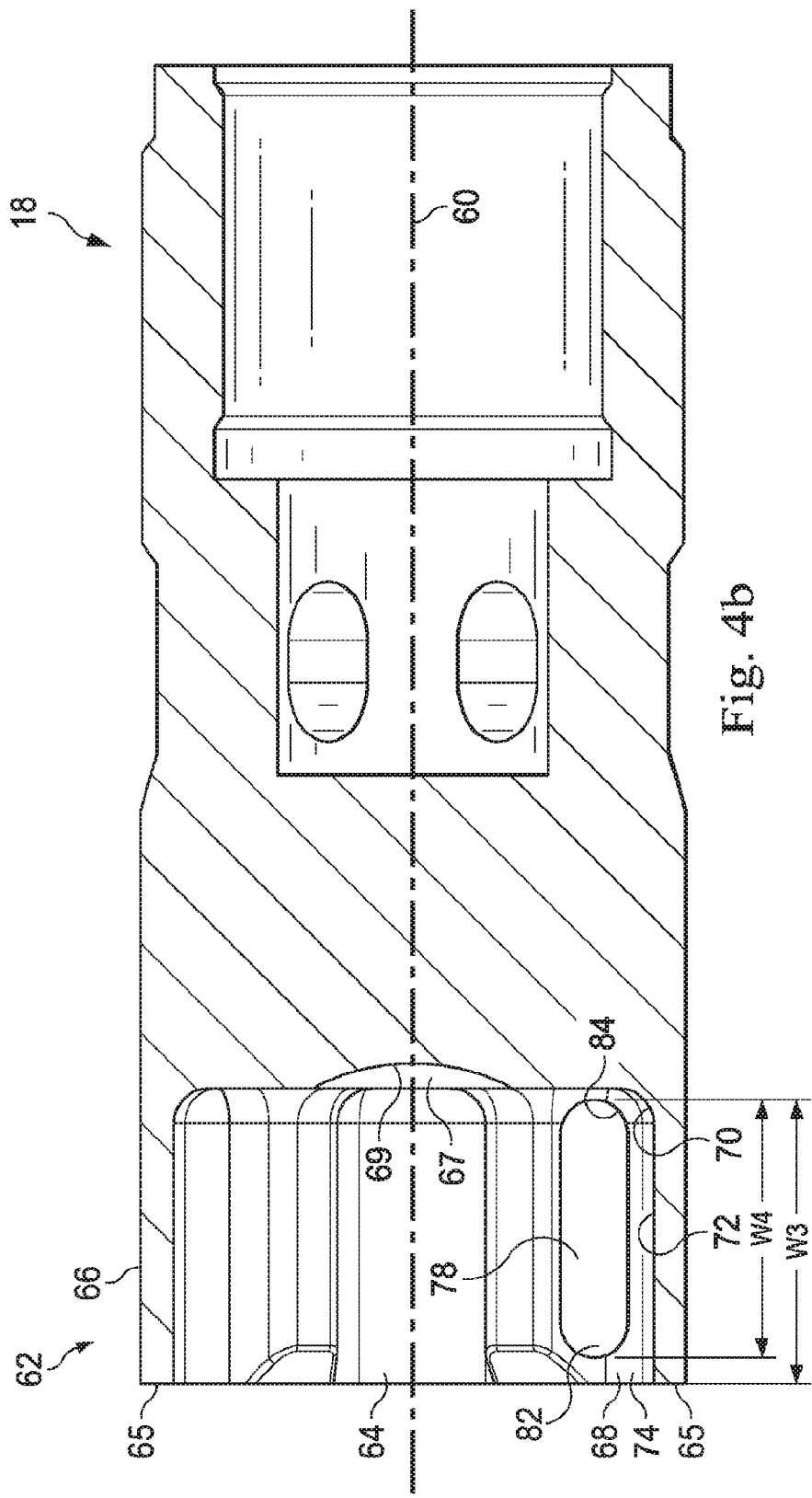
Figure 4C:
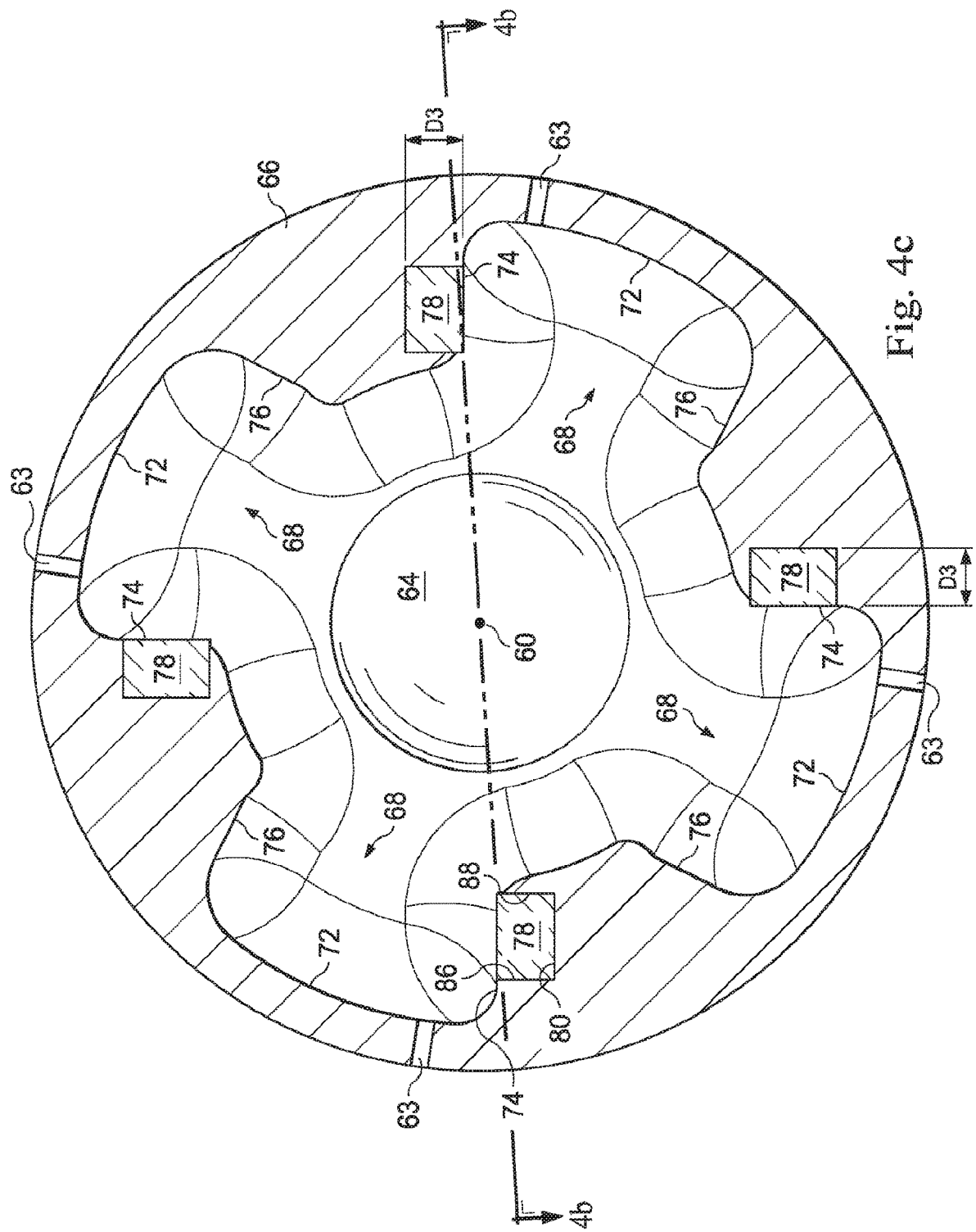

Turning to FIGS. 4a, 4b and 4c, first end housing 18 is illustrated in more detail. It will be appreciated that first end housing 18 has a longitudinal axis 60 and generally includes a cylindrical socket section 62. Socket section 62 defines a bore 64 extending from a first end 65 of housing 18 to a second end 67 and bound by a generally cylindrical sidewall 66. The second end 67 of socket section 62 may include a thrust bearing surface 69. In one or more embodiments, thrust bearing surface 69 is concave. Sidewall 66 of socket section 62 includes one or more slots 68, each slot 68 being generally shaped to receive an arm 28 as described above, and each slot 68 opening into bore 64. Although the disclosure is not limited to a particular number of slots 68, in some embodiments, sidewall 66 may include 2 opposing slots 68; three slots 68 equally spaced about the perimeter of the cylindrical sidewall 66, or four slots 68 equally spaced about the perimeter of the cylindrical sidewall 66.

Each slot 68 is generally elongated, extending from first end 65 of housing 18 to a second end 70 of the slot 68 so as to be generally parallel with longitudinal axis 60. Slot 68 is formed by cylindrical sidewall 66, a first sidewall 74 extending radially inward from sidewall 66 and a second sidewall 76 spaced apart from first sidewall 74 and generally extending radially inward from sidewall 66. First sidewall 74 of slot 68 may be defined along a plane 75. Slot 68 has a width W3 between the first end 65 and second end 70. It will be appreciated that width W3 also may represent the width of first sidewall 74 and second sidewall 76 since the two sidewalls 74, 76 define the slot 68. One or more lubrication ports 63 may also be defined in sidewall 66. In one or more embodiments, a lubrication port 63 may be positioned adjacent each slot adjacent the first sidewall 74 so as to facilitate lubrication at the point of engagement between components of the drive shaft assembly 12 and components of the end housing 18. In some embodiments, the lubricant utilized for this purpose may be a viscous fluid, such as hydraulic gear oil, with a nano diamond particle additive. It will be appreciated that the nano-sized diamond powder, when mixed with the oil or other lubrication fluid, stays dispersed and functions to reduce friction by maintaining a thick lubrication fluid film between the friction surfaces.

Figure 5:
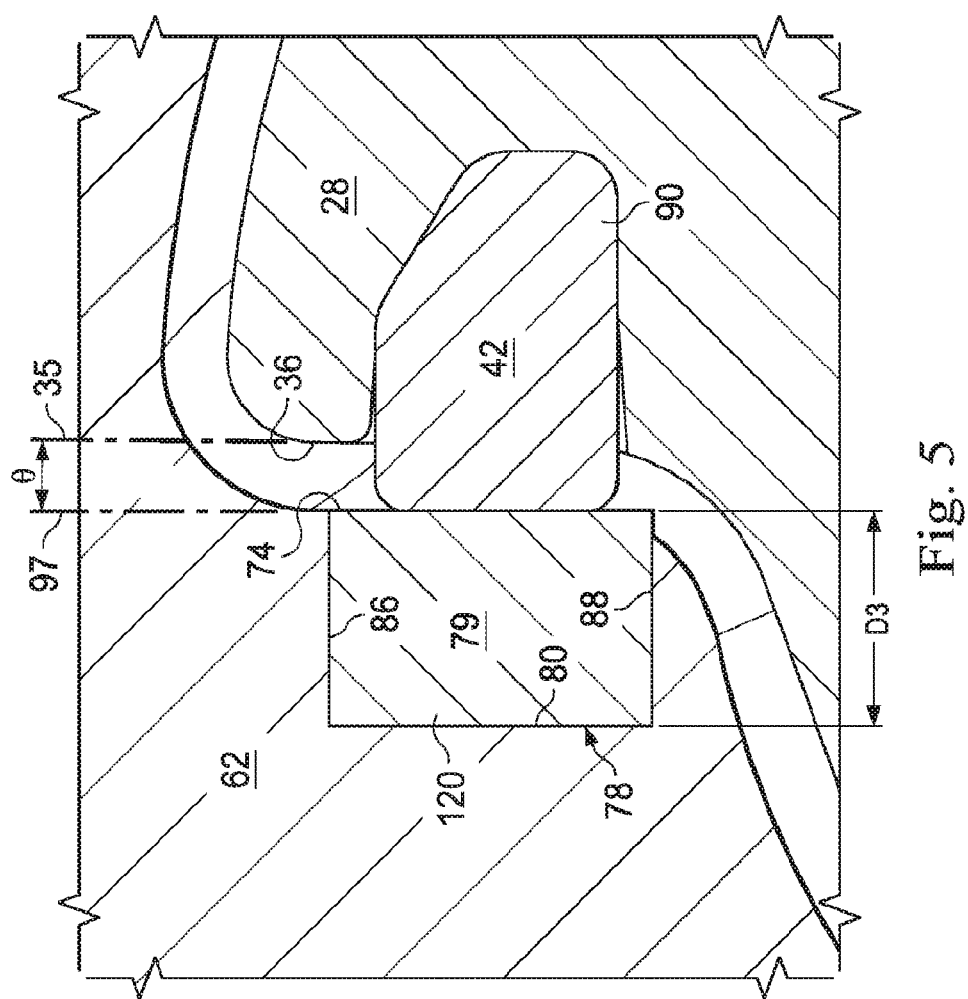
FIG. 5 is a cross-sectional view of a drive shaft insert cavity formed in an arm of a drive shaft adjacent a coupling insert cavity formed along a slot of first end housing.

Formed in the first sidewall 74 is a cavity 78, as best shown in FIG. 5. Cavity 78 need not have any particular shape so long as it is disposed to receive a female insert 120 (see FIG. 6b) as described below. In one or more embodiments, cavity 78 is generally characterized by a back wall 80, an end wall 82, an end wall 84 opposing end wall 82, a top wall 86 and a bottom wall 88. Cavity 78 may be characterized as having a depth D3 where D3 is the distance from first sidewall 74 of slot 68 to the back wall 80 of cavity 78. Cavity 78 may be characterized as having a width W4, where W4 is the distance from end wall 82 end wall 84. It will be appreciated that cavity 78, in one or more embodiments, may formed in first sidewall 74 so as to be spaced apart from cylindrical sidewall 66 as well as from first end 65 of housing 18 so as to protect an insert, such as insert 120 described below, when deployed within cavity 78. Back wall 80 functions as a flat bearing surface for coupling 18, via inserts, as described below.

With reference to FIG. 6a, a drive shaft insert 90 is illustrated. Drive shaft insert 90 is formed about an axis 92 and generally is characterized by a back wall 94 being arcuate or cylindrical in shape about axis 92. Arcuate back wall 94 intersects first load face 96 at a first end 98 and intersects face 96 at an opposing second end 100, the distance between the ends 98, 100 along across face 96 being of width W2' (which may be approximately the same as width W2). Arcuate back wall 94 generally includes a substantially flat face 102 that is generally parallel with axis 92. First load face 96 may be described as being defined along a plane 97. In one or more embodiments, W2' is selected to be greater than the depth D1 of cavity 42 so that when drive shaft insert 90 is seated in cavity 42, drive shaft insert 90 protrudes beyond face 36 of cavity 42.

Drive shaft insert 90 also has a bottom wall 104 and a first upper wall 106. First upper wall 106 extends at an angle from back wall 94 and similar to back wall 94, includes a substantially flat face 108. In one or more embodiments, the angle between first upper wall 106 and back wall 94 is between 115 and 130 degrees. In one or more embodiments, the angle between first upper wall 106 and back wall 94 is approximately 122 degrees. A second upper wall 110 that is substantially parallel with bottom wall 104 may extent from first upper wall 106, and likewise, includes a substantially flat face 112. As such, it will be appreciated that first upper wall 106 is conical in shape. Thus, as will be appreciated, drive shaft insert has both a distinct and separate conical surface and a separate and distinct cylindrical surface. As will be described in more detail below, application of a force on first load face 96 will result in counter forces on both faces 102 and 106 that will together assist in retaining the insert 90 in cavity 42 (FIGS. 3 and 5) and minimize movement of the insert 90 in the cavity 42.

Drive shaft insert 90 is preferably formed of a first material having a first galling resistance. In one or more embodiments, the first material may be flexible and have a low modulus of elasticity. It has been found that such a flexible material allows more uniform load transfer between mating surfaces.

In FIG. 6b, a coupling insert 120 is illustrated. Coupling insert 120 includes a first wall 122 formed of a generally flat surface 124 that will function as the load face as described below. Other than a first wall 122, in some embodiments, insert 120 may take any shape so long as it is disposed to seat in cavity 78 (described above). In one or more other embodiments, insert 120 may include a second wall 126 generally parallel with first wall 122 (such that coupling insert 120 has a depth D3'), an upper wall 128, a lower wall 130 and opposing end walls 132, 134. In one or more embodiments, D3' is selected to be greater than the depth D3 of cavity 78 so that when coupling insert 120 is seated in cavity 78, coupling insert 120 protrudes beyond face 74 of cavity 78.

In one or more embodiments, coupling insert 120 is preferably formed of a second material having a second galling resistance. In one or more embodiments, the second material may be flexible and have a low modulus of elasticity. It has been found that such a flexible material allows more uniform load transfer between mating surfaces. Preferably, the second material is different than the first material described above with respect to drive shaft insert 90, and in particular, the galling properties of the two materials differ. In other words, while both the drive shaft insert 90 and coupling insert 120 may each be flexible, with a generally low modulus of elasticity, they may be selected to have different galling properties.

Non-limiting examples of materials that may be used for inserts 90, 120 are beryllium-copper alloys, aluminum-bronze alloys, nickel-cobalt-chromium-molybdenum alloys, copper-nickel-tin alloys, and high silicon, high manganese, nitrogen strengthened, austenitic stainless alloys.

Figure 7A:
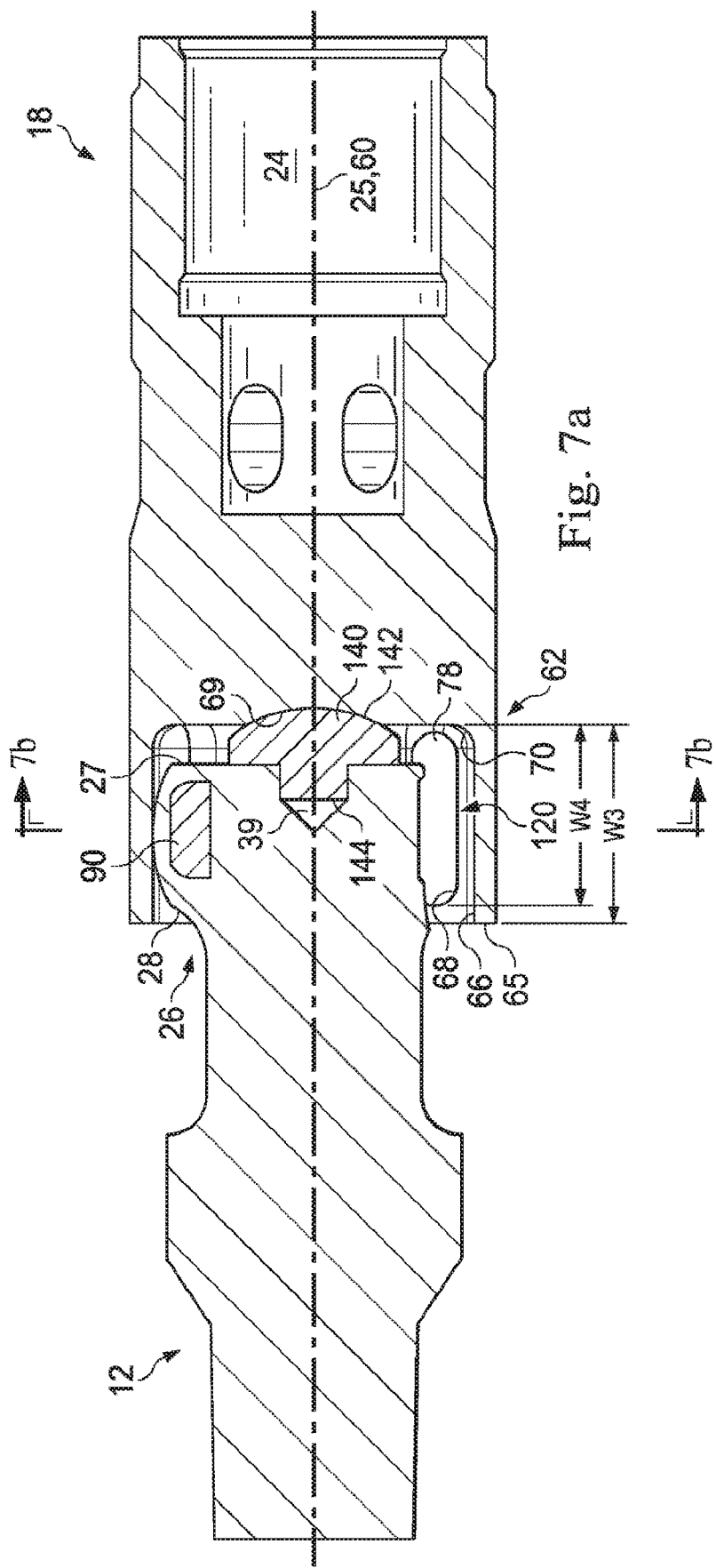
FIG. 7a is a cross-section view through a power transmission assembly.

With reference to FIG. 6c, a thrust pad 140 is illustrated. Thrust pad 140 may be circular in shape and preferably includes an outer, dome-shaped or convex bearing surface 142 and a mechanism 144 for securing thrust pad 140 to first end 14 of drive shaft 12 as shown in FIG. 7a below. Although not limited to a particular type of securing mechanism, in one or more embodiments, mechanism 144 may be a projection disposed to seat in aperture 29 of thrust bearing surface 27 of drive shaft 12.

Turning to FIGS. 7a and 7b, the first end 14 of the drive shaft 12 is shown engaged with the first end housing 18 of drive shaft assembly 10 so that the end section 26 of drive shaft 12 seats within the socket section 62 of first end housing 18 so that thrust bearing pad 140 bears against thrust bearing surface 69. It will be appreciated that because of the convex shape of pad 140 and the concave shape of bearing surface 69, drive shaft 12 and end housing 18 can pivot relative to one another about their respective axis 25, 60.

Moreover, as shown in FIG. 5, with on-going reference to FIGS. 7a and 7b, when end section 26 of drive shaft 12 seats within the socket section 62 of first end housing 18, an arm 28 of drive shaft assembly 10 is positioned in a slot 68 of first end housing 18. In particular the first face 36 of an arm 28 is disposed adjacent the first sidewall 74 of a slot 68 so that an insert 90 carried in the cavity 42 of arm 28 can bear against an insert 120 carried in the cavity 78 of sidewall 74 when drive shaft 12 is rotated about its axis 25, thus permitting transmission of torque from the drive shaft 12 to the end housing 18. In the illustrated embodiments of FIGS. 7a, 7b and 7c, four arms 28 are disposed to engage four slots 68. Thus, four drive shaft inserts 90 bear against four coupling inserts 120 and function as the primary points of rotational contact between the drive shaft assembly 12 and the end housing 18. However, embodiments may utilize any number of arms and slots, although at least two arms and at least two slots are preferable, and where at least two arms and at least two slots are utilized, in one or more embodiments, the arms and slots are uniformly spaced about the primary axis 25, 60. In any event, arms 28 and slots 68 align so that the inserts 90, 120 are adjacent one another for power transfer. The flexible nature of the inserts 90, 120 overcome any manufacturing variation to ensure uniform loading across the respective faces of the inserts.

Furthermore, it will be appreciated that the load transfer is between a flat bearing surface on housing 18 (back wall 80) and both conical and cylindrical bearing surfaces on the arm 28 (walls 196 and 94, respectively).

The differences in the galling properties of the first and second materials that make up inserts 90, 120, respectively, minimize galling between the inserts 90, 120 under torsional load. Moreover, the compressive force applied against first load face 96 of each drive shaft insert 90 results in counter forces on both faces 102 and 106 that will together assist in retaining the insert 90 in cavity 42 and minimize movement therein. This distribution in two different directions is due in part to the flat surfaces of drive shaft insert 90 in one or more embodiments. In this same vein, as described above with respect to FIG. 3, cavity 42 may include clearances to permit elastic deformation of the drive shaft insert 90 under applied load without shearing or otherwise damaging the insert 90. The upper clearance is implemented by virtue of the angle α described above, so that a gap is formed between the second upper wall 110 of insert 90 and the portion 71 of second upper wall 54 adjacent first face 36. Likewise, the lower clearance is implemented by virtue of the angle 3 described above, so that a gap is formed between the bottom wall 104 of insert 90 and the portion 58 of bottom wall 50 adjacent first face 36. It will be appreciated that the above described clearances may be utilized to accommodate deformation of drive shaft insert 90 without resulting in damage to insert 90.

Likewise, arm 28 may be formed to accommodate tilting of drive shaft 12 when engaging end housing 20 without damaging drive shaft insert 90. As best seen in FIG. 5, in one or more embodiments, first face 36 of an arm 28 may be formed so that when drive shaft insert 90 is seated in cavity 42, plane 35 of first face 36 forms an angle θ with the plane 97 along which face 96 of drive shaft insert 90 is formed. In one or more embodiments, the angle θ is between 0.5 and 8 degrees, while in other embodiments, the angle θ is at least three degrees while in other embodiments the angle θ is approximately 4 degrees. The angle θ is selected to permit sufficient clearance to accommodate tilting of drive shaft 12. It will be appreciated that when torque is transferred through the engagement of drive shaft insert 90 and coupling insert 120, it is desirable that the face 96 of drive shaft insert 90 be substantially parallel with the first sidewall 74 of slot 68. Therefore, the angle θ also represents the angle between plane 75 along which first sidewall 74 of slot 68 is formed and plane 97 along which face 36 of arm 28 is formed. Angle θ is the main angle that allows articulation of the joint.

Finally, the arcuate shape of the back wall 94 of the drive shaft insert 90 and the arcuate shape of the back wall 44 of the cavity 42 permits some rotational movement of insert 90 about axis 92 within cavity 42, thus accommodating relative movements between the drive shaft assembly 12 and the end housing 18, and further minimizing possible damage to drive shaft insert 90.

Thus, a constant velocity joint for downhole power transmission has been described. The constant velocity joint may generally include a drive shaft defined along a first longitudinal axis, the drive shaft having a radially extending arm; a tubular housing defined along a second longitudinal axis, the housing formed of a cylindrical sidewall with a radially extending slot formed along the sidewall; a first insert mounted in the arm, the first insert formed of a first material having a first galling property; and a second insert mounted in the housing along the slot, the second insert formed of a second material having a second galling property different than the first galling property. A constant velocity joint for downhole power transmission may include a drive shaft defined along a first longitudinal axis, the drive shaft having a radially extending arm; a tubular housing defined along a second longitudinal axis, the housing formed of a cylindrical sidewall with a radially extending slot formed along the sidewall; and a first insert, the first insert comprising a flat surface, a cylindrical surface intersecting the flat surface, and a conical surface intersecting the second cylindrical surface, wherein the insert is mounted in the arm or the the housing along the slot. A constant velocity joint for downhole power transmission may include a drive shaft defined along a first longitudinal axis, the drive shaft having a radially extending arm, the arm having a first cavity formed therein; a tubular housing defined along a second longitudinal axis, the housing having a radially extending slot formed by an outer sidewall of the housing, a first sidewall extending radially inward from the outer sidewall and a second sidewall spaced apart from first sidewall and generally extending radially inward from outer sidewall; a second cavity formed in the first sidewall; a first insert mounted in the first cavity; and a second insert mounted in the second cavity; wherein the arm has a first end, a second end and an outer bearing surface, wherein the first cavity is formed in the arm so as to be spaced apart from the first end, the second end and the outer bearing surface of the arm; wherein the first sidewall extends from a first end of the slot to a second end of the slot, wherein the second cavity is formed in the first sidewall so as to be spaced apart from the first end and the second ends of the slot and spaced apart radially inward from the outer sidewall. Finally, a drive shaft assembly has been described and may include a drive shaft defined along a first longitudinal axis; an arm radially extending from the drive shaft, the arm having a cavity formed therein; and an insert mounted in the cavity, the insert comprising a flat surface, a cylindrical surface intersecting the flat surface, and a conical surface intersecting the second cylindrical surface.

Any of the foregoing may include any one of the following elements, alone or in combination with each other:

One of the inserts comprises a flat surface, a cylindrical surface intersecting the flat surface, and a conical surface intersecting the second cylindrical surface.

The first insert is formed of a first material having a first galling property; and the second insert is formed of a second material having a second galling property different than the first galling property.

The lubricant comprises a viscous fluid with a nano-sized diamond particle additive.

A lubrication port defined in the outer sidewall, the lubrication port positioned adjacent the first sidewall of a slot.

The arm has a first width and a first height and the cavity has a second width and a second height, the second height and width being less than the first height and width so that the cavity is spaced apart from the arm ends and outer bearing surface.

The first sidewall of the tubular housing has a first width and a first height and the second cavity has a second width and a second height, the second height and width of the second cavity being less than the first height and width of the first sidewall so that the cavity is spaced apart from the slot ends and the outer sidewall.

At least one insert is formed of a flexible material.

At least one insert is formed of an alloy selected from the group consisting of beryllium-copper alloys, aluminum-bronze alloys, nickel-cobalt-chromium-molybdenum alloys, copper-nickel-tin alloys, and high silicon, high manganese, nitrogen strengthened, austenitic stainless alloys.

The first cavity includes an arcuate back wall and the first insert includes an arcuate back wall, the first insert mounted in the first cavity so that the arcuate backwalls are adjacent to permit the first insert to rotate within the cavity about a central axis of the first insert.

The first sidewall of the tubular housing has a first width and a first height and the second cavity has a second width and a second height, the second height and width of the second cavity being less than the first height and width of the first sidewall so that the cavity is spaced apart from the slot ends and the outer sidewall.

The cavity is defined in a first face of the arm, the first face formed along a first plane, and wherein the first insert is characterized by a first load face formed along a second plane, the first insert mounted in the cavity so that and angle of at least 3 degrees is formed between the first and second planes.

The cavity is defined in a first face of the arm, the first face formed along a first plane, and wherein the first insert is characterized by a first load face formed along a second plane, the first insert mounted in the cavity so that and angle of between 0.5 and 8 degrees is formed between the first and second planes.

The cavity is defined in a first face of the arm, the first face formed along a first plane, and wherein the first insert is characterized by a first load face formed along a second plane, the first insert mounted in the cavity so that and angle of approximately 4 degrees is formed between the first and second planes.

The first cavity is defined in a first face of the arm and the first cavity characterized by an upper wall and a lower wall, the upper wall having a first portion extending from the first face and a second portion extending from the first portion and the lower wall having a first portion extending from the first face and a second portion extending from the first portion, wherein the second portions of the upper and lower walls are substantially parallel, and at least one of the first portions forms an angle of at least 0.5 degrees.

At least one of the first portions forms an angle of between 0.5 and 8 degrees.

At least one of the first portions forms an angle of approximately 4 degrees.

The first cavity has a first cavity depth and the first insert has a first insert depth that is greater than the first cavity depth so that the first insert protrudes from the first cavity when the first insert is mounted in the first cavity.

The second cavity has a second cavity depth and the second insert has a second insert depth that is greater than the second cavity depth so that the second insert protrudes from the second cavity when the second insert is mounted in the second cavity.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A downhole power transmission joint comprising:
   a drive shaft defined along a first longitudinal axis and rotatable about the first longitudinal axis, the drive shaft having a radially extending arm and a first cavity extending into a rotationally leading or trailing face of the radially extending arm;
   a tubular housing defined along a second longitudinal axis, the housing formed of a cylindrical sidewall with a radially extending slot formed along the cylindrical sidewall;
   a first insert mounted in the first cavity of the radially extending arm, the first insert formed of a first material having a first galling property; and
   a second insert mounted in the housing along the slot and engaging the first insert, the second insert formed of a second material having a second galling property different than the first galling property.

2. The joint of claim 1, wherein one of the inserts comprises a flat surface, a cylindrical surface intersecting the flat surface, and a conical surface intersecting the cylindrical surface.

3. The joint of claim 1, wherein at least one insert is formed of an alloy selected from the group consisting of beryllium-copper alloys, aluminum-bronze alloys, nickel-cobalt-chromium-molybdenum alloys, copper-nickel-tin alloys, and high silicon, high manganese, nitrogen strengthened, austenitic stainless alloys.

4. The joint of claim 1, further comprising a lubrication port defined in the cylindrical sidewall, the lubrication port positioned adjacent a first sidewall of the radially extending slot; and a viscous fluid with a nano-sized diamond particle additive injected into the slot.

5. The joint of claim 1, wherein the arm has a first width and a first height and the first cavity has a second width and a second height, the second height and width being less than the first height and width so that the first cavity is spaced apart from ends of the arm and an outer bearing surface of the arm; and wherein a first sidewall of the radially extending slot has a first width and a first height and a second cavity formed in the first sidewall has a second width and a second height, the second height and width of the second cavity being less than the first height and width of the first sidewall so that the second cavity is spaced apart from ends of the slot and an outer sidewall of the housing.

6. The joint of claim 1, wherein the first cavity includes an arcuate back wall and the first insert includes an arcuate back wall, the first insert mounted in the first cavity so that the arcuate back wall of the first insert is adjacent the arcuate back wall of the first cavity to permit the first insert to rotate within the first cavity about a central axis of the first insert.

7. The joint of claim 1, wherein the rotationally leading or trailing face of the radially extending arm is formed along a first plane, and wherein the first insert is characterized by a first load face formed along a second plane, the first insert mounted in the first cavity so that an angle of at least 3 degrees is formed between the first and second planes.

8. The joint of claim 1, wherein the first cavity is characterized by an upper wall and a lower wall, the upper wall having a first portion extending from the rotationally leading or trailing face and a second portion extending from the first portion and the lower wall having a first portion extending from the rotationally leading or trailing face and a second portion extending from the first portion, wherein the second portions of the upper and lower walls are substantially parallel, and at least one of the first portions forms an angle of at least 0.5 degrees with respect to the corresponding second portion of the upper wall or the lower wall.

9. The joint of claim 1, wherein the first cavity has a first cavity depth and the first insert has a first insert depth that is greater than the first cavity depth so that the first insert protrudes from the first cavity when the first insert is mounted in the first cavity; and wherein a second cavity formed in the housing has a second cavity depth and the second insert has a second insert depth that is greater than the second cavity depth so that the second insert protrudes from the second cavity when the second insert is mounted in the second cavity.

10. The joint of claim 1, wherein the first cavity extends in a circumferential direction into the radially extending arm.

11. A downhole power transmission joint comprising:
a drive shaft defined along a first longitudinal axis and rotatable about the first longitudinal axis, the drive shaft having a radially extending arm and a first cavity extending into the radially extending arm from a rotationally leading or trailing face of the radially extending arm;
a tubular housing defined along a second longitudinal axis and rotatable about the second longitudinal axis, the housing formed of a cylindrical sidewall with a radially extending slot formed along the cylindrical sidewall and a second cavity extending into the housing from a leading or trailing sidewall of the radially extending slot;
a first insert mounted in the first cavity; and
a second insert mounted in the second cavity and engaging the first insert, at least one of the first insert and the second insert comprising a flat surface, a cylindrical surface intersecting the flat surface, and a conical surface intersecting the second cylindrical surface.

12. The joint of claim 11, wherein the first insert is formed of a first material having a first galling property; and the second insert is formed of a second material having a second galling property different than the first galling property.

13. The joint of claim 11, wherein the arm has a first width and a first height and the fig cavity has a second width and a second height, the second height and width being less than the first height and width so that the first cavity is spaced apart from ends of the arm and an outer bearing surface of the arm; and wherein the second cavity is formed in a first sidewall of the radially extending slot, wherein the radially extending slot has a first width and a first height and the second cavity has a second width and a second height, the second height and width of the second cavity being less than the first height and width of the first sidewall so that the second cavity is spaced apart from the slot ends and an outer sidewall.

14. The joint of claim 11, wherein the first cavity includes an arcuate back wall and the first insert includes an arcuate back wall, the first insert mounted in the first cavity so that the arcuate back wall of the first insert is adjacent the arcuate back wall of the first cavity to permit the first insert to rotate within the first cavity about a central axis of the first insert.

15. The joint of claim 11, further comprising a lubrication port defined in the cylindrical sidewall, the lubrication port positioned adjacent a first sidewall of the radially extending slot; and a viscous fluid with a nano-sized diamond particle additive injected into the slot.

16. The joint of claim 11, wherein the first cavity is defined in the rotationally leading or trailing face of the arm, the rotationally leading or trailing face formed along a first plane, and wherein the first insert is characterized by a first load face formed along a second plane, the first insert mounted in the first cavity so that an angle of at least 3 degrees is formed between the first and second planes.

17. The joint of claim 11, wherein the first cavity extends in a circumferential direction into the radially extending arm.

18. A downhole power transmission joint comprising:
a drive shaft defined along a first longitudinal axis, the drive shaft having a radially extending arm, the arm having a first cavity formed therein;
a tubular housing defined along a second longitudinal axis, the housing having a radially extending slot formed by an outer sidewall of the housing, a first sidewall extending radially inward from the outer sidewall and a second sidewall spaced apart from first sidewall and generally extending radially inward from outer sidewall;
a second cavity formed in the first sidewall;
a first insert mounted in the first cavity; and
a second insert mounted in the second cavity,
wherein the arm has a first end, a second end and an outer bearing surface, wherein the first cavity is formed in the arm so as to be spaced apart from the first end, the second end and the outer bearing surface of the arm;
wherein the first sidewall extends from a first end of the slot to a second end of the slot, wherein the second cavity is formed in the first sidewall so as to be spaced apart from the first end and the second end of the slot and spaced apart radially inward from the outer sidewall.

19. The joint of claim 18, wherein the arm has a first width and a first height and the first cavity has a second width and a second height, the second height and width being less than the first height and width so that the first cavity is spaced apart from the arm ends and the outer bearing surface.

20. The joint of claim 18, wherein the first sidewall of the tubular housing has a first width and a first height and the second cavity has a second width and a second height, the second height and width of the second cavity being less than the first height and width of the first sidewall so that the second cavity is spaced apart from the slot ends and the outer sidewall.

* * * * *

UNITED STATES PATENT AND TRADEMARK OFFICE
CERTIFICATE OF CORRECTION

PATENT NO. : 10,975,623 B2
APPLICATION NO. : 16/062046
DATED : April 13, 2021
INVENTOR(S) : Sandip Sonar, Hamid Sadabadi and Steven Park Page 1 of 1

It is certified that error appears in the above-identified patent and that said Letters Patent is hereby corrected as shown below:

In the Claims

Column 12, Line 11, Claim 13: change "fig" to -- first --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*